3,788,883
RAILROAD BALLAST CONSTRUCTION AND COMPOSITIONS OF MATTER FOR RAILROAD BALLAST CONSTRUCTION
Fritz S. Rostler, Alameda County, Richard M. White, Contra Costa County, and Jack W. Newton, Alameda County, Calif., assignors to Phillips Petroleum Company, Bartlesville, Okla.
Continuation of abandoned application Ser. No. 773,186, Nov. 4, 1968. This application Dec. 23, 1971, Ser. No. 211,705
Int. Cl. B44d 1/02
U.S. Cl. 117—100 R
22 Claims

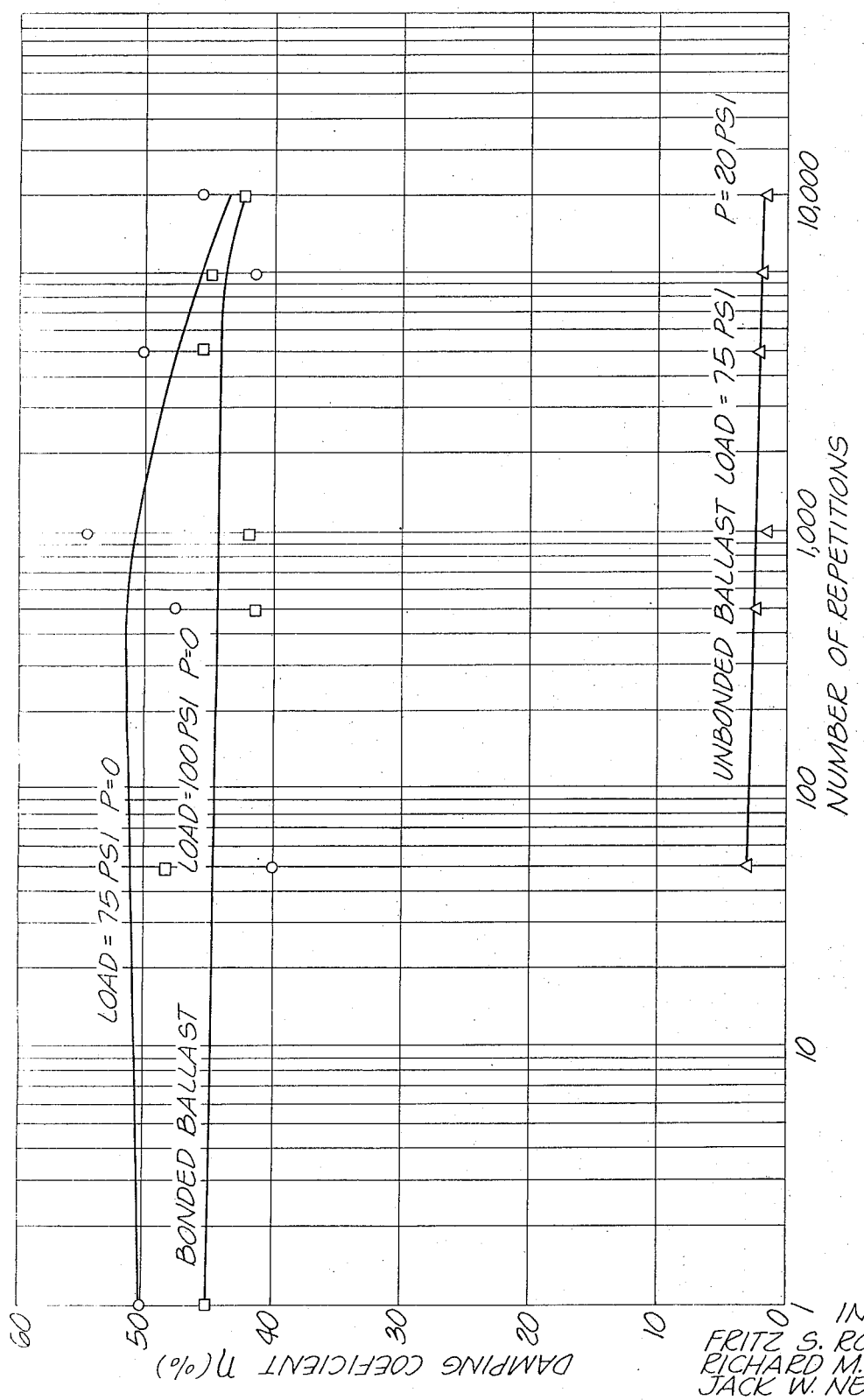

ABSTRACT OF THE DISCLOSURE

This invention relates to bonding of rock aggregates by means of an elastomer bonding agent and relates particularly to railroad bed construction in which the ballast is bonded by means of an elastomer bond between the individual rock particles of the aggregate, and to methods of construction, and to compositions of matter useful for producing said elastomeric bond.

---

This application is a continuation of application Ser. No. 773,186, filed Nov. 4, 1968, now abandoned.

SUMMARY OF THE INVENTION

This invention relates to compositions of matter suitable for bonding of rock particles to produce an elastomeric bond between the rock and to form an open bonded rock structure in which the contiguous rock particles are bonded at localized, contiguous surfaces by the elastomeric bonding agent.

Such structures include railroad bed ballasts, dam facing, and other rock structures where it is desirable to hold the rock in a secure construction resistant to static or vibratory forces.

In a preferred embodiment of our invention the bonding composition of our invention may be applied to said rock ballast.

The rock aggregates employed in the structures of our invention are such as will result in open porous structures, and for such purposes we do not employ the well-graded mixes such as are employed in road construction. Such mixes include a range of particle sizes that will produce packed structures with minimum voids.

The ballast of our invention has strength suitable for resisting crushing by imposed static and dynamic loads resulting from trains operating at high speed. The ballast is resistant to abrasion. The individual rock particles of the ballast are bound together, and their movement relative to each other is limited. The ballast is bound into relatively unitary structure, and thus lateral and longitudinal displacement by applied load of the moving train is minimized. The displacement of the track is thus also minimized.

The ballast bed, composed of the bound particles, is an open, porous roadbed which provides good drainage. It is resistant to disruptive forces resulting from freezing and thawing, since the open, porous structure will not trap water which will freeze and subsequently thaw.

Ballast structures with the above properties are obtained by localized bonding at contact areas between adjacent rock particles of the roadbed, by means of an elastomeric bonding agent. The elastomeric bonding agent which we prefer to employ is one having the following properties: elongation before break or yield point, whichever is the lesser, of at least 10%; and tensile modulus at elongation of 50% or less of at least 300 p.s.i., when measured by ASTM D412–66.

The preferred elastomeric bonding agent is a thermoplastic elastomer of the block copolymer type, or of the trans-diene polymer type, or a blend of the two polymers. The elastomers which we prefer are fully described in the copending application of Fritz S. Rostler, Ser. No. 690,572, filed Dec. 14, 1967, now abandoned, which is herewith incorporated by this reference as if the specification thereof had been set forth completely at this place.

DESCRIPTION OF THE DRAWINGS

FIG. 4 shows a comparison of the damping coefficient of unbonded aggregate and of aggregate bonded with the composition of Example 2.

DETAILED DESCRIPTION

Figure 1:
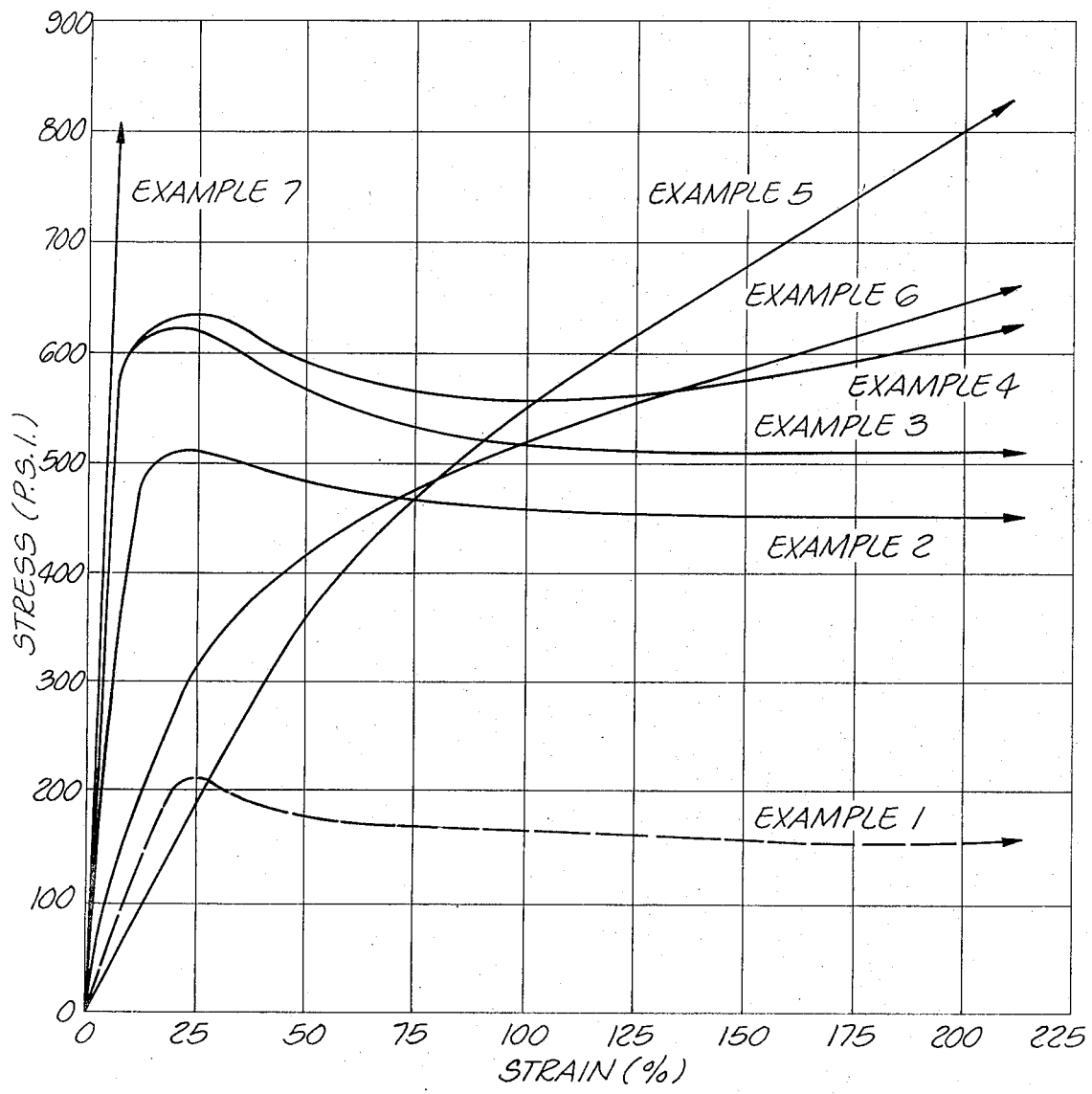
FIG. 1 shows portions of the stress-strain curves for elastomeric materials of the examples in the specification.

Block copolymers are symbolized by the symbols which refer to the composition blocks of the monomers which enter into the formation of the copolymer. Block copolymers, as employed in the examples, are the result of copolymerization of blocks of monomers which are produced in an initial step of homopolymerization. Examples of such types of copolymers generally included within the term SBR copolymers are copolymers having configurations such as are described here.

When the homopolymer poly(butadiene) has the configuration $(b-b-b-b)_n=B$, and poly(styrene) has the configuration $(s-s-s-s-s)_n=S$, block copolymers of these homopolymers have the configuration

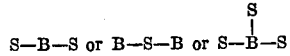

Thermoplastic block copolymers, illustrated by those employed in the following examples, are those of the

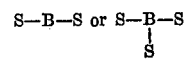

type, in which the end blocks are the relatively rigid plastic blocks S and the inner block is the elastic chain-like block B.

An informative paper on the influence of structure and composition on properties of block copolymers has been published by Childers and Kraus in "Rubber Chemistry and Technology," 40 (4), 1183–1199 (September 1967). Since no claim is made to the polymers per se, and since they have been described in the prior art, it will be sufficient to refer to the above-cited literature and also to U.S. Pats. 2,975,160; 3,113,912; 3,251,905; 3,231,635; 3,239,478; 3,242,038; 3,265,765; 3,299,174; and 3,333,024, which pertain to block copolymers.

For a discussion of the present state of knowledge pertaining to block copolymers, their chemical constitution, the influence of molecular weight of the constituent blocks etc., sec particularly the research papers by Childers and Kraus.

For this invention, we prefer to use the poly(styrene)-poly(butadiene)-poly(styrene) block copolymers having the above described characteristics. These copolymers have been described in the above-cited patents as having the following characteristics, to wit: conjugated diene blocks of molecular weight between 2,000 and 1,000,000, and the end blocks having a molecular weight between 2,000 and 100,000.

Other block copolymers such as poly(styrene)-poly(acrylonitrile) - poly(styrene); poly(styrene) - poly(isoprene)-poly(styrene), or other combinations of plastic elastic block polymers may also be used. Those skilled in the art will also be able to substitute, for block copolymers, graft polymers or other polymers as long as this fulfills the requirements of the characteristics for which the block copolymers are chosen in accord with the present invention, i.e., capable of developing material strength without the step of vulcanization by heat.

The designation SBR stands for styrene-butadiene rubber. Examples of SBR block copolymers which may be used in the preparation of the elastomeric bonding material of our invention include the products produced by Phillips Petroleum Company and identified in Table 1.

ical examples of commercial resins having suitable properties are, in addition to poly(styrene), the Neville Chemical Co. resins "Nevchem," "Nebony," "Anares," "R-16," and "R-16A," and the Pennsylvania Industrial Chemical Corp. resins, "Picco," "Piccopale," "Piccolyte," "Piccodiene," "Picotex," and "Resinex."

The resins are identified by the suppliers as shown in Table 3.

TABLE 3

| | |
|---|---|
| Nevchem | Aromatic hydrocarbon resin. |
| Nebony | Aromatic hydrocarbon resin. |
| Anares | Hydrocarbon resin. |
| R-16 | Coumarone-indene resin. |
| R-16A | Courmarone-indene resin. |
| Picco | Aromatic polyindene and coumarone-indene resin. |
| Piccopale | Hydrocarbon resins. |
| Piccolyte | Alpha and beta terpene polymers. |
| Piccodiene | Aromatic resin. |
| Piccotex | Vinyl toluene - $\alpha$ - methylstyrene copolymer. |
| Resinex | Aromatic resins. |

An extender oil, such as commonly used in rubber compounding and described in ASTM Method D226, Description of Types of Petroleum Extender Oils, may be used. The use of extenders is well known. Examples of suitable extenders are Witco Chemical Company products Califlux GP and Califlux 550, Phillips Petroleum Company product Philrich 5, and Shell Oil Company products Dutrex 739 and Dutrex 1786; all further identified as shown in Table 4.

TABLE 1

| Polymer* designation | B/S[1] | Percent S[2] | I.V.[3] | MS-4[4] | Brookfield viscosity[5] | T[6] | Elongation[6] |
|---|---|---|---|---|---|---|---|
| CD 821 | 65/35 | 35 | 1.29 | 104 at 240° F | 3,600 | 4,000 | 810 |
| CD 822 | 60/40 | 38 | 1.45 | 70 at 270° F | 7,800 | 3,350 | 990 |
| CD 823 | 65/35 | 35 | 1.07 | 101 at 240° F | 1,700 | 3,500 | 875 |
| CD 824 | 60/40 | 25 | 1.37 | 94 at 212° F | 12,000 | 2,750 | 975 |
| CD 825 | 50/50 | 45 | 0.92 | 46 at 275° F | 850 | 3,400 | 800 |
| CD 957 | 65/35 | 35 | 1.29 | 104 at 240° F | 2,450 | 4,080 | 740 |
| CD 960 | | 28.8 | 1.89 | | 760 | 2,620 | 1,000 |
| Solprene 406-01 | | | | | 3,700 | 4,250 | 800 |
| Solprene 406-02 | | | | | 2,300 | 4,170 | 775 |
| CD 1252 | | | | 42 at 270° F | 460 | 4,300 | 775 |

[1] Butadiene-styrene ratio.
[2] Percent styrene as block.
[3] Inherent viscosity (for definition, see Journal of Colloid Science I (3) 261-9, May, 1946; reprinted in Rubber Chemistry Tech. XIX (4) 1092-6, Oct., 1964).
[4] Mooney viscosity, ASTM designation D 1646.
[5] Brookfield viscosity of a 15% solution in trichlorethylene, cp. at 77° F., using No. 4 spindle.
[6] ASTM Designation D 412.
* Polymers sold by Phillips Petroleum Company.

Other suitable block copolymers are the products produced by Shell Chemical Company and identified in Table 2.

TABLE 2

| | Tensile strength, p.s.i.[1] | Elongation at break, percent[1] |
|---|---|---|
| Kraton 101 | 4,600 | 880 |
| Kraton 102 | 4,100 | 950 |

[1] ASTM D412-667.

Other suitable elastomers include polyurethanes, flexible epoxy resins, ambient-temperature-curing poly(vinyl acetate)-phenolic copolymers, ambient-temperature-vulcanizing rubber compounds based on neoprene, and butadiene-acrylonitrile copolymers.

The elastomers may be stiffened by adding a stiffening resin in the form, for example, of an amorphous resin. A suitable stiffening resin may be a styrene polymer or coumarone-indene resin. The resin should have properties which are similar to those of the coumarone-indene type, and resins derived from coal tar or petroleum can be used. The preferred softening point range of the amorphous resin is from about 140° F. to 300° F. The main characteristics of the resin are that it is compatible with the block copolymer, is amorphous, and does not possess the elastomeric properties of being extensible and retractable.

While we do not wish to be bound to any theory, it is believed that the resins aparently function to some extent similarly to the rigid blocks of the block copolymers .Typ-

TABLE 4

| | Rubber extender oil, ASTM type | Viscosity at 25° C., cp. |
|---|---|---|
| Califlux GP | 101 | 12,000 |
| Califlux 550 | 101 | 750,000 |
| Philrich 5 | 101 | 30,000 |
| Dutrex 739 | 101 | 22,000 |
| Dutrex 1786 | 101 | 28,000 |

Nitrogen bases, derived from petroleum or from natural asphalts such as gilsonite, also are suitable extenders, as are other materials commonly used as rubber extenders and familiar to persons skilled in the art.

An example of nitrogen bases from natural asphalts is a nitrogen bases concentrate derived from gilsonite. It may have the following typical properties:

Initial boiling point at 760 mm. Hg, ° F. _____ 226
Chemical composition
 (ASTM Method D2006), percent:
  A _____ 2.3
  N _____ 91.1
  $A_1$ _____ 4.2
  $A_2+P$ _____ 2.4

However, we prefer to use a minimum concentration of such extender oil which will produce the desirable qualities of the composition set forth herein, and preferably to omit such oil entirely.

The preferred elastomeric bonding agent, modified as desired by the addition of a stiffening resin, or an extender, or both, may be applied dissolved in a volatile solvent or applied in the form of an emulsion. Antioxidants and antiozonants, such as commonly used to inhibit the attack of oxygen and ozone on rubber compounds, may be added to the composition to improve the aging properties of the binder.

The proportions of the block copolymer, coumarone-indene stiffening resins or their equivalents and the extender oils employed are adjusted to give a polymer composition which will have the modulus and properties set forth above.

The ratio of the polymer and the stiffening resin may be in the range of about 75% copolymer and about 25% by weight of stiffening resin to about 25% by weight of the copolymer and about 75% by weight of the stiffening resin, based on the weight of the mixture of the copolymer and stiffening resin.

Preferably we avoid the use of extender oils if the viscosity of the polymer will permit the components to be blended and will result in the composition having the modulus and properties set forth above. We find that, as a practical matter, the extender oil, such as ASTM type 101, should not be used in excess of about 10% of the weight of the polymer.

The bonding agent may be applied to the aggregate as a solution in a solvent or as an emulsion. Suitable solvents are low boiling, e.g., below about 125° C., chlorinated hydrocarbons, such as trichlorethylene, and aromatic solvents such as benzene, toluene, and xylene. Coal tar naphthas or petroleum derived solvents containing these chemicals may also be used. One skilled in the art may select various suitable solvents or azeotropes from those listed in the literature, e.g., Solvents Guide, by Marsden and Mann (Cleaver-Hume Press Ltd., London).

In flash point tests which we have conducted using mixtures of xylene and trichlorethylene, we have found that a weight ratio of 10 parts of trichlorethylene to 40 parts of xylene and 50 parts of rubber extender oil, ASTM type 101, provide a flash point of 100° F. Higher trichlorethylene:xylene ratios of 1:1, 2:1, or higher, may be used. In each case a total of 50 parts of trichlorethylene and xylene with 50 parts of rubber extender oil, ASTM type 101, provided flash points above 100° F. Consistent with keeping the flash point at a safe level, i.e., above about 80° F. according to ICC regulations, we may use weight ratios of volatile aromatic hydrocarbon type solvent to polar volatile solvent up to about 5:1 and preferably up to about 4:1.

Some types of elastomeric bonding agents are more readily dissolved in ketone-type solvents; for instance, methyl ethyl ketone has been found suitable for use with butadiene-acrylonitrile copolymers.

The following are given by way of example but not as a limitation of the solutions which are suitable for application of the elastomer binder for the cementing of the rock aggregates.

EXAMPLE 1

A polymer mixture was made consisting of:

| | Percent by weight |
|---|---|
| Thermoplastic block SBR copolymer [1] | 38.9 |
| Coumarone-indene resin, 100° C. s.p. [2] | 38.9 |
| Nitrogen bases from gilsonite | 19.5 |
| 2,2' - methylenebis (4 - methyl - 6 - tertiarybutyl phenol) [3] | 0.4 |
| Nickel dibutyldithiocarbamate [4] | 0.4 |
| Unpelletized SRF black | 1.9 |

[1] Kraton 102.
[2] Neville R–16; s.p.=softening point.
[3] An antioxidant.
[4] An antiozonant.

60% by weight of the above mixture was dissolved in 40% by weight of a solvent composed of:

| | Percent by weight |
|---|---|
| Trichlorethylene | 94 |
| Xylene | 6 |

The polymer cast from this solution had the properties shown in Table 5.

EXAMPLE 2

A mixture was made of Kraton 102–66.7% by weight and coumarone-indene resin, 100° C. softening point (Neville R–16)—33.3% by weight.

35% of this mixture by weight was dissolved in 65% by weight of a solvent composed of:

| | Percent by weight |
|---|---|
| Trichlorethylene | 87 |
| Benzene | 13 |

The polymer cast from this solution had the properties shown in Table 5.

EXAMPLE 3

In this example, the concentration of the stiffening resin in the polymer mixture of Example 2 was increased to 50% by weight of the coumarone-indene resin, and the concentration of the elastomer was reduced to 50% by weight of Kraton 102.

30% by weight of this mixture was dissolved in 70% by weight of a solvent composed of 93% by weight of trichlorethylene and 7% by weight of benzene.

The polymer cast from this solution had the properties shown in Table 5.

EXAMPLE 4

35% by weight of a mixture composed of 40% by weight of Kraton 102 and 60% by weight of coumarone-indene resin of Example 2 was dissolved in 65% by weight of a mixture composed of 89% by weight of trichlorethylene and 11% by weight of benzene.

The properties of the polymer cast from this solution are given in Table 5.

EXAMPLE 5

An ambient-temperature-vulcanizing rubber compound consisting of:

| | Percent |
|---|---|
| NBR copolymer [1] | 57.8 |
| Stearic acid | 0.6 |
| Zinc oxide | 3.0 |
| Sulfur | 0.9 |
| SRF black | 37.5 |
| Activated dithiocarbamate [2] | 0.2 |

[1] Hycar 1072, a product of B. F. Goodrich Chemical Co.
[2] Butyl Eight, a product of R. T. Vanderbilt Co.

28% by weight of the above mixture was dissolved and dispersed in 72% by weight of methyl ethyl ketone.

The properties of the vulcanized rubber are given in Table 5.

Elastomeric bonding agents of the polyurethane type and the flexible epoxy resin type, which can be formed in place from liquid reactants, can be applied without any volatile vehicles or solvents.

The following are given as examples, but not as limitations, of elastomeric bonding agents applied without solvents.

EXAMPLE 6

A polyurethane elastomer was prepared consisting of:
A polyether triol with average molecular weight about 1500 (sold by Union Carbide Corp. as Polyol LHT–112), 79% by weight was mixed with tolylene diisocyanate, 21% by weight.

The mixture was applied to the rock aggregate, and the mixture cured in place at ambient temperature.

The properties of the cured elastomer are given in Table 5.

EXAMPLE 7

A flexible epoxy resin was prepared by mixing: Epoxy resin Tipox B, 50% by weight with liquid polymer flexibilizer and curing agent EM308, 50% by weight, and applying the liquid mixture to the rock aggregate, where it was cured in place at ambient temperature. Both ingredients are products of Thiokol Corp.

The properties of the cured resin are given in Table 5.

mer in normal use will not be subjected to stresses above its yield point. If the yield point of the binder is reached, it is believed that the bonds are stressed into their non-elastic state, and the binder will no longer perform its intended function of absorbing energy in recoverable deformation of the binder.

An excessive movement of the ballast particles will occur, resulting in a deformation of the structure and eventual misalignment of the track, as occurs with untreated ballast.

Tests made for the selection of the bonding agent showed that the bonding agents which conform to the stress-strain criteria stated above give superior results when rock particles bonded by such bonding agents are subjected to either static or vibratory forces.

TABLE 5.—PHYSICAL PROPERTIES OF MATERIALS EVALUATED AS BONDING AGENTS

| Example number | Hardness shore A | Tensile strength (p.s.i.) | Percent Elongation | Set | Resilience Bashore | Modified Yerzley test Deflection (percent) | Damping (cycles) | Frequency (c.p.s.) |
|---|---|---|---|---|---|---|---|---|
| 1 | 54 | 210 | 725 | 28 | 28 | (¹) 8 | 3 | 10 |
| 2 | 81 | 3,780 | 875 | 39 | 38 | 4.3 | 9 | 12 |
| 3 | 86 | 2,900 | 800 | 60 | 35 | 3.8 | 13 | 13 |
| 4 | 87 | 2,010 | 650 | 90 | 33 | 2.9 | 12 | 14 |
| 5 | 72 | 1,400 | 365 | 6 | 31 | 25 | 6 | 5 |
| 6 | 64 | 710 | 250 | 1 | | | | |
| 7 | 96 | 1,880 | 75 | 4 | 46 | 3.9 | 12 | 16 |

¹ Creeps.

NOTES:
Stress-strain properties (tensile strength, elongation and set); ASTM D412-66T.
Hardness, Shore A; ASTM D2240-64T.
Resilience, Bashore; India Rubber World, vol. 95, No. 6, p. 37 (1937); ASTM D2623 proposed.
Resilience, Yerzley; ASTM D945-59.
Compression set; ASTM D395-61, Method B.

The elastomeric bonding agent of this invention may also be applied in the form of an emulsion, as will be set forth later in this specification.

FIG. 1 gives the stress-strain curves for the mixtures of Examples 1–7. It will be seen from Table 5 and FIG. 1 that all of the formulations of Examples 2–7 are superior to the formulation of Example 1. Compositions such as those of Examples 2–7, which have at least 10% elongation before break or yield point and a tensile modulus of at least 300 p.s.i. at an elongation (strain) of 50% or less, give superior results as bonding agents for aggregates, in that they produce structures which will support static and dynamic forces such as are imposed on railroad ballast by trains operating at high speed.

It will be observed that the binders of Examples 5 and 6 have a smooth S-shaped curve typical of vulcanized elastomers. The polymer compositions of Examples 2–4 deform elastically up to about 10%–25% strain and at about 500–600 pounds p.s.i. However, all of the polymer compositions of Examples 2–7 have a tensile modulus of more than 300 pounds p.s.i. at 50% strain.

The materials of Examples 2–7 will be suitable for use in binding a railroad ballast.

The quantity of added oil should be held to an amount not greater than that which results in the above elongation of 10 percent before break or yield point and a tensile modulus of at least 300 p.s.i. at an elongation of 50% or less.

The formulation in Example 1 has a modulus below that preferred as described above. By reducing the quantity of the oil fraction illustrated by the nitrogen bases from gilsonite to less than about 10% based on the weight of the polymers, and preferably omitting the extender oils entirely, where that is possible, the modulus referred to above may be obtained. This is illustrated by Examples 2–12.

We prefer to select as a binder a polymer composition which will conform to the above properties. The purpose of selecting the polymer, as stated above, is that the polymer in normal use will not be subjected to stresses above The properties of the system composed of bonded rock aggregate suitable for use as railroad ballast may be classified under the following classes:

(1) Low permanent set with load repetition.
(2) High stress-strain properties.
(3) Low stress decay with load repetition.
(4) Low strain decay with load repetition.

The following tests were made on bonded rock samples under conditions which, by engineering experience, would represent the performance of the system of this invention under actual field operations.

Each specimen was tested in static compression to a stress level of 75 p.s.i. and its stress-strain curve recorded. The specimen was then subjected to dynamic loading at a rate of 300 load repetitions per minute at an initial strain corresponding to more than 75 p.s.i. stress. After 18,000 load repetitions, the specimen was again tested in static compression to 75 p.s.i. and its stress-strain curve recorded. The specimen was then subjected to further dynamic loading at 300 repetitions per minute at an initial strain corresponding to more than 75 p.s.i. After an additional 100,000 load repetitions, the stress-strain properties were again measured and recorded. Permanent set (non-recoverable deformation) was determined by measuring the height of the specimen initially and after each static test.

For each specimen tested, the following measurements were recorded:

(1) Compressive axial strain under a statically applied stress of 75 p.s.i. at 1, 18,000 and 118,000 reptitions;
(2) Permanent deformation with load repetitions; and
(3) Stress before and after load repetitions.

Table 6 shows the test results obtained using the binders of the examples. This table shows which bonding agent contributed the preponderance of desirable properties, i.e., high strength and low values for permanent set, stress decay, and strain decay.

TABLE 6.—DYNAMIC TEST RESULTS ON STABILIZED BALLAST SPECIMENS

| Bonding agent of Example | Amount (parts/ 100 rock) | Applied as— | Dynamic test history (KC) | Strain 75 p.s.i. (percent) | Test period (KC.) | Percent | | P.s.i. | |
|---|---|---|---|---|---|---|---|---|---|
| | | | | | | Initial strain applied | Set | Initial stress applied | Stress at end of period |
| 1 | 4.2 | Solution | 0 | 0.36 | 0–18 | 0.74 | 0.28 | 150 | 66 |
| | | | 18 | 0.52 | 18–118 | 0.90 | 0.54 | 130 | 27 |
| | | | 118 | 0.84 | | | | | |
| 2 | 2.0 | ...do | 0 | 0.18 | 0–18 | 0.52 | 0.04 | 230 | 140 |
| | | | 18 | 0.28 | 18–118 | 0.56 | 0.10 | 180 | 110 |
| | | | 118 | 0.38 | | | | | |
| 3 | 2.1 | ...do | 0 | 0.30 | 0–18 | 0.68 | 0.20 | 170 | 72 |
| | | | 18 | 0.50 | 18–118 | 0.88 | 0.20 | 130 | 75 |
| | | | 118 | 0.68 | | | | | |
| 4 | 2.4 | ...do | 0 | 0.04 | 0–18 | 0.42 | 0.26 | 780 | 67 |
| | | | 18 | 0.18 | 18–118 | 0.56 | 0.44 | 230 | 34 |
| | | | 118 | 0.24 | | | | | |
| 5 | 2.5 | Solution/ slurry. | 0 | 1.8 | 0–18 | 2.2 | 0.14 | 83 | 29 |
| | | | 18 | 3.0 | 18–118 | 3.4 | 0.26 | 87 | 37 |
| | | | 118 | 4.5 | | | | | |
| 6 | 3.8 | 2-part resin | 0 | 1.3 | 0–18 | 1.6 | 0.14 | 98 | 65 |
| | | | 18 | 1.7 | 18–118 | 2.1 | 0.24 | 91 | 62 |
| | | | 118 | 2.3 | | | | | |
| 7 | 5.7 | ...do | 0 | 0.10 | 0–18 | 0.48 | 0.28 | 360 | 170 |
| | | | 18 | 0.12 | 18–118 | 0.50 | 0.30 | 310 | 70 |
| | | | 118 | 0.32 | | | | | |

Note.—KC=kilocycles.

The tests described above for comparing elastomeric bonding agents were run under conditions of unconfined compression; that is, the specimens were not subjected to any imposed lateral confining pressure. Untreated rock aggregate cannot be tested under unconfined conditions, since it is a cohesionless system. To compare untreated rock aggregate with rock aggregate treated with the preferred elastomeric bonding agent of Example 2, specimens of both were tested in both static and dynamic compression in triaxial testing equipment, where a lateral confining pressure, simulating the lateral support of adjacent parts of the rock aggregate structure, is applied by means of pressure on a flexible membrane which confines the specimen.

Figure 2:
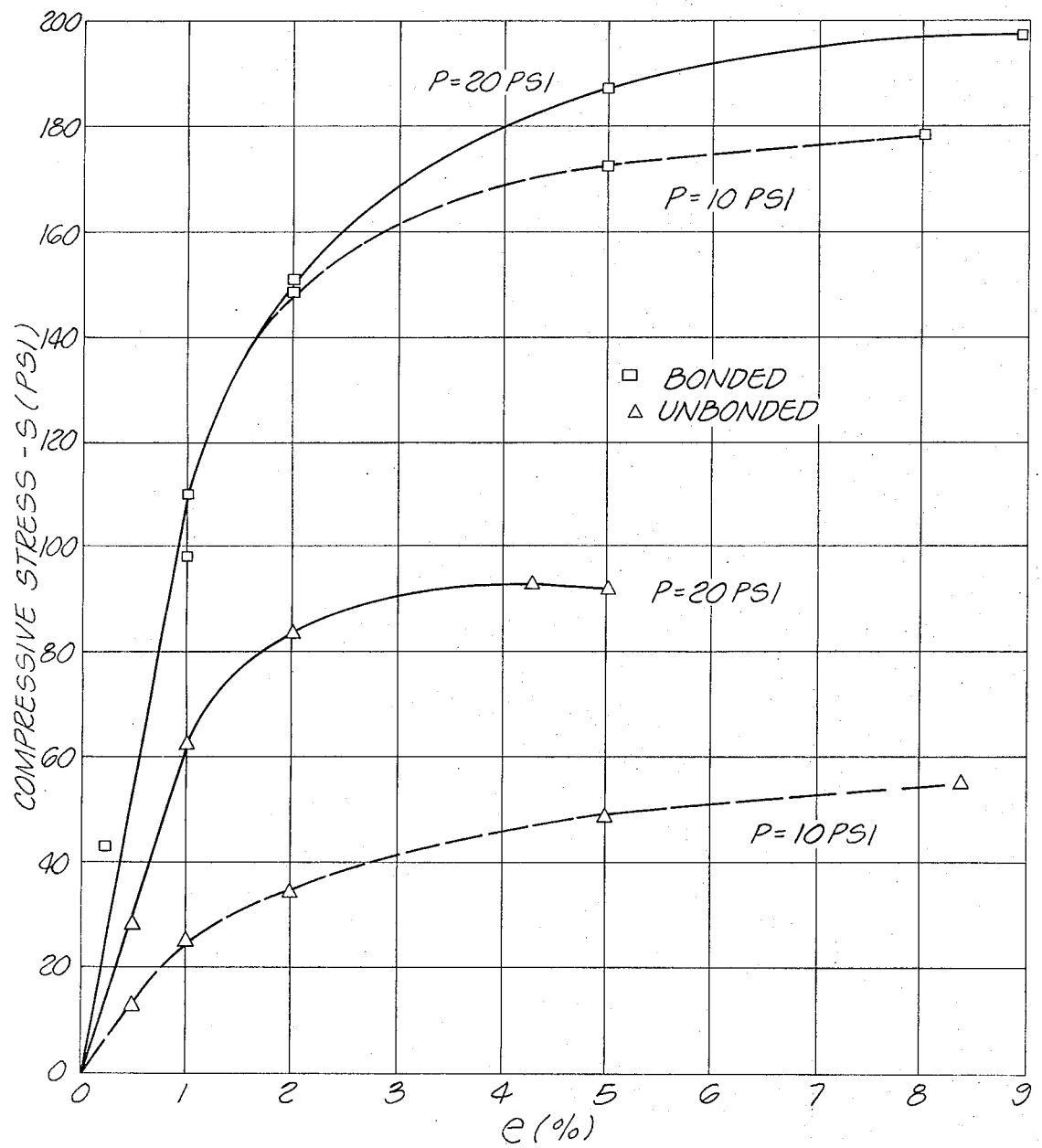
FIG. 2 is a comparison of the compressive stress-strain curves of untreated aggregate with treated aggregate, employing the bonding agent of Example 2.

The improvement in load-carrying capacity of bonded rock aggregate employing the composition of Example 2 is shown in FIG. 2. The deflection e for the bonded aggregate is shown to be less at all loads S at each level of confining pressure P.

Figure 3:
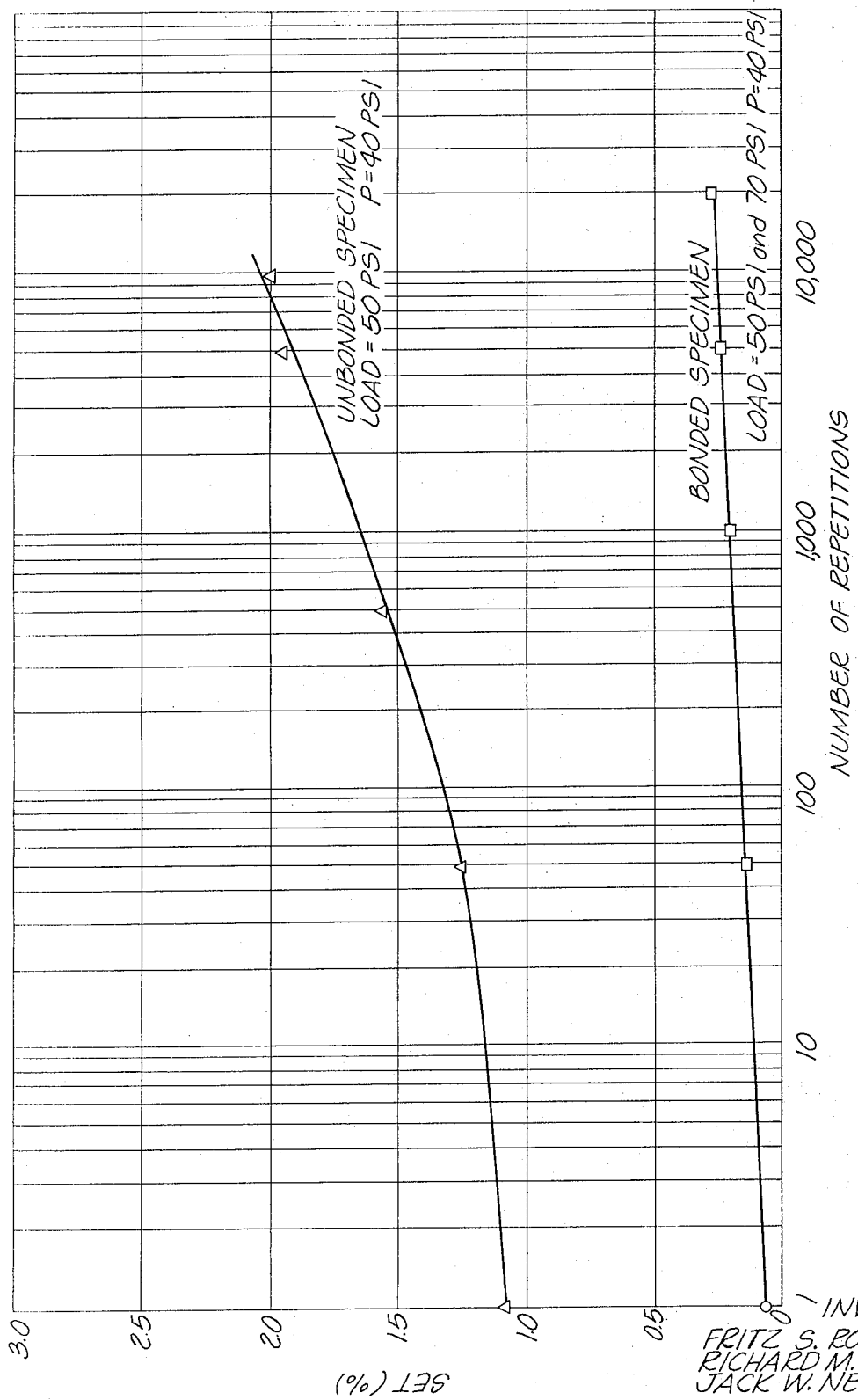
FIG. 3 shows a comparison of the permanent set of unbonded aggregate and of aggregate bonded with the composition of Example 2.

The improvement in permanent set (non-recoverable deformation) under dynamic loading conditions, employing the composition of Example 2, is shown in FIG. 3. The very low permanent set of the treated rock aggregate indicates that track laid on ballast consisting of such treated rock aggregate can be expected to retain satisfactory alignment for much longer service life than track on untreated ballast. This is a very important characteristic, since misalignment is a principal cause of the necessity of frequent maintenance and repair work on track structures.

The improvement in energy absorption is shown in FIG. 4, which compares the damping coefficient of untreated rock aggregate and rock aggregate treated with the composition of Example 2. Damping coefficient ($\eta$) is equal to the energy absorbed during a dynamic cycle divided by the total energy applied during the cycle. Damping is one of the important functions of the rock aggregate ballast in a track structure, absorbing much of the vibrational energy of passing trains and minimizing the reflection of the vibrations into the rolling stock or transmission to adjacent structures.

Instead of applying the polymer to the rock structure as a solution in the polar solvent, we have found that a further improvement is obtained by applying the polymer as an emulsion. We prefer to employ a cationic emulsion, using cationic surfactants as emulsifiers. Preferably we employ the polymer in the form of a water emulsion, and most preferably as a cationic emulsion stabilized by a cationic emulsifier.

A great number of cationic surfactants are available which are suitable. The cationic surfactant should be a good emulsifying agent and provide a lasting positive charge. Small amounts of a nonionic surfactant can also be added to facilitate emulsification and to minimize foaming.

Emulsifiers may be of the class of fatty quaternary ammonium salts, fatty amido-amino-amine salts, e.g. amido-amino-amine acetate, etc., and include the use of cationic surfactants with nonionic surfactants such as poly (ethoxy) compounds. Various suitable surfactants are described in standard textbooks such as Encyclopedia of Surface Active Agents, by Sisley and Wood (Chemical Publishing Company, Inc., New York), and Surface Active Agents and Detergents, by Schwarz, Perry and Berch (Interscience Publishers, New York).

In forming the emulsion, the polymer, modified as desired with an amorphous resin, or an extender, or both, is dispersed in a minimum amount of solvent to form what is termed the emulsion base. The emulsion base preferably has a viscosity of about 20,000 to 30,000 centipoises at 25° C. as determined by a Brookfield viscometer, so that it may be readily emulsified. The specific gravity of the polymer-resin-solvent system (emulsion base) should be close to that of water, for example, about 0.9 to 1.1. This may be accomplished by blending of the various polar and non-polar solvents referred to above. After achieving the proper specific gravity for the emulsion base, the system is then emulsified in water with a cationic emulsifier. The emulsion may be acidified to a pH of about 4.5 to 6.5. Acetic, propionic, and hydrochloric acids are preferred acids for use in the acidification.

The emulsifier or surfactant concentration should be kept relatively low so as to prevent spontaneous re-emulsification when the composition, after application to the ballast and evaporation of the water phase, is rewet as, for example, by rainfall. Preferably, the concentration of emusifier is about 3 percent or less by weight of the total emulsion concentrate.

The water phase may be adjusted to any convenient concentration, for example, 20% to 30% by weight.

The following examples are examples of emulsions constituting preferred embodiments of our invention, which are illustrations but not limitations of our invention.

EXAMPLE 8

| | Percent |
|---|---|
| Thermoplastic block SBR copolymer (Kraton 102) | 65.5 |
| Coumarone-indene resin, softening point 100° C. | 32.7 |
| 2-2'-methylenebis(4-methyl-6-tertiary butyl phenol) | 0.9 |
| Nickel dibutyldithiocarbamate | 0.9 |

The above, as a 45% solution in

| | Percent |
|---|---|
| Trichloroethylene | 60 |
| Xylene | 40 | was applied as 75% emulsion in

| | Percent |
|---|---|
| Water | 98 |
| Methyldodecylbenzyltrimethylammonium chloride | 2 |

EXAMPLE 9

| | Percent |
|---|---|
| Thermoplastic block SBR copolymer (Kraton 102) | 22.0 |
| Coumarone-indene resin, 100° C. softening point | 11.0 |
| 2-2'-methylenebis(4-methyl-6-tertiary butyl phenol) [1] | 0.3 |
| Nickel dibutyldithiocarbamate [2] | 0.3 |
| Xylene | 16.6 |
| Trichlorethylene | 24.8 |
| Methyldodecylbenzyltrimethylammonium chloride (50%) | 1.0 |
| Water | 24.0 |

[1] Antioxidant.
[2] Antiozonant.

The binder, whether deposited from a solution in a solvent or an emulsion, has substantially the same properties. The emulsion, however, has the advantage of being more practical in that it does not present a fire hazard.

When the elastomeric bonding agent is in the form of an emulsion, its viscosity, which affects the spreading and penetration characteristics and the rate of deposition of the binder on the rock aggregate, can be varied as required by dilution with water, which is an inexpensive and readily available diluent.

One principal advantage of the emulsions of our invention is that most of the cementing agent is concentrated on the points of contact beween the rocks instead of forming a coating of the rock surface. Thus, nearly all material applied serves as shock-absorbing cushion and effective cementing agent.

The following examples illustrate the result obtained by applying the elastomer system as a solution, Example 10, and the same elastomer system as an emulsion, Example 11. In both cases the elastomeric bonding agent was applied to the rock aggregate specimens, and the specimens were tested in the same manner as for the specimens and tests shown in Table 6 and described above.

EXAMPLE 10

The mixture of thermoplastic block SBR copolymer Kraton 102, 66.7% by weight, and coumarone-indene resin R–16, 33.3% by weight, shown above in Example 2, was dissolved, 30% by weight of the above mixture in 70% by weight of a solvent mixture consisting of trichlorethylene, 93% by weight, and xylene, 7% by weight. The solution was applied to rock aggregate and deposited 2.4% by weight of binder on the rock aggregate.

EXAMPLE 11

The mixture of thermplastic block SBR copolymer Kraton 102, 66.7% by weight, and coumarone-indene resin R–16, 33.3% by weight, shown above in Examples 2 and 10, was dissolved, 42% by weight of the above mixture in 58% by weight of a solvent mixture consisting of trichlorethylene, 76% by weight, and xylene, 24% by weight. The above solution, 75% by weight, was emulsified in an aqueous solution, 25% by weight, consisting of water, 99.1% by weight, and methyldodecylbenzyltrimethylammonium chloride, 0.9% by weight. The emulsion was applied to rock aggregate and deposited 2.1% by weight of binder on the rock aggregate.

EXAMPLE 12

A mixture of thermoplastic block styrene-butadiene copoylmer, 960 CD, identified above in Table 1, was mixed with coumarone-indene resin (100° C. softening point) R–16, referred to above in Table 3, and sold by the Neville Chemical Company, in the proportions of 15 weight percent of the block copolymer and 7.5 weight percent of the coumarone-indene resin, and the mixture dissolved in 31.5 weight percent of trichlorethylene and 21 weight percent of xylene. The above mixture was dispersed into 24.55 weight percent of water, the mixture containing 0.45% methyldodecylbenzyltrimethylammonium chloride.

EXAMPLE 13

A mixture of thermoplastic block styrene-butadiene copolymer, 957 CD, identified above in Table 1, was mixed with coumarone-indene resin (100° C. softening point) R–16, referred to above in Table 3, and sold by the Neville Chemical Company, in the proportions of 14.3 weight percent of the block copolymer and 7.1 weight percent of the coumarone-indene resin, and the mixture dissolved in 50.0 weight percent of xylene. This mixture was dispersed into 28.2 weight percent of water, the mixture containing 0.4% methyldodecylbenzyltrimethylammonium chloride.

The data in Table 7 show that the properties of the specimens of Examples 10 and 11 were equivalent, even though the emulsion-treated specimen had a smaller amount of binder than the solution-treated specimen, demonstrating the more efficient utilization of the binder in the emulsion system, which deposits more of the binder at the points where the particles of the rock aggregate contact each other.

TABLE 7.—COMPARISON OF EMULSION APPLICATION WITH SOLUTION APPLICATION OF BINDER

| | | | | | Compressive Failure | | Dynamic test | | | | |
|---|---|---|---|---|---|---|---|---|---|---|---|
| | | | | | | | | Percent | | P.s.i. | |
| Ex. | Form of application | Number of applications | Binder deposited, parts/100 rock | Dynamic history, KC | Strain at 75 p.s.i. (percent) | Stress, p.s.i. | Strain, percent | Test period KC | Initial strain applied | Set | Initial stress applied | Stress at end of period |
| 10 | Solution, 30% solids | One | 2.4 | 0 | 0.34 | | | 0.18 | 0.72 | 0.12 | 159 | 63 |
| | | | | 18 | 0.68 | | | 18–118 | 1.06 | 0.28 | 116 | 56 |
| | | | | 118 | 0.92 | 200 | ca. 2 | | | | | |
| 11 | Emulsion, 31% solids | One | 2.1 | 0 | 0.52 | | | 0–18 | 0.9 | 0.16 | 130 | 64 |
| | | | | 18 | 0.84 | | | 18–118 | 1.20 | 0.28 | 107 | 55 |
| | | | | 118 | 1.18 | 100–110 | ca. 2 | | | | | |

In employing the emulsion, it is desirable that the emulsion be stable, so that it may be transported and stored. It is necessary that, on contact with the rock structure, the emulsion break before it runs through the open, porous rock structure, in order that the bond be deposited between and at the surfaces in contact between the individual rock particles.

Since rock surfaces have different polar properties, the requirement that the emulsion be stable in storage and sufficiently unstable to break on contact with the rocks is further complicated by the requirement that it should not break entirely on first contact for, in which case, too much binder is deposited on the upper layers of the rock structure, and the rocks in the lower layers are starved.

We have solved this dilemma if it occurs by the control of the polar nature of the rock surfaces with the expedient of treating the rock layers with an electrolyte. This electrolyte is preferably applied in the form of a solution which establishes the required pH at the surface of the rocks. This pH is preferably above 7, and thus we employ an alkaline solution. The pretreatment of the rock is not necessary with alkaline rock; e.g., limestone.

Suitable solutions are ammonium hydroxide, soluble hydroxides such as alkali metal hydroxides, carbonates, and bicarbonates. Aqueous ammonia is preferred because, even if used in excess, the excess ammonia will evaporate from the rock.

The preferred procedure is to wash the ballast with water, then to spray the ballast with the electrolyte solution, followed promptly with the emulsion.

Tables 8, 9 and 10 below describe a series of tests of various pretreatments with several electrolytes and show the results obtained.

The data in Table 8 shows that the technique of wetting the rock with a saturated solution of sodium bicarbonate caused the emulsion to break and deposit the binder on the rock, whereas deposition of binder from the same emulsion was inadequate without pretreatment. Tests on full-size ballast rock, described in Table 9, confirmed, in terms of amounts of binder deposited and appearance of the treated ballast, that this technique is applicable to treating rock of the size used in ballast.

Additional tests were run to compare other alkaline solutions with sodium bicarbonate solution. Sodium carbonate, sodium hydroxide and aqueous ammonia were used. The experiments are summarized in Table 10.

TABLE 8.—PRETREATMENT OF GRANITE ROCK WITH SODIUM BICARBONATE

| Pretreatment | 100 ml. water | 100 ml. saturated $NaHCO_3$ solution (ca. 8%). | 100 ml. saturated $NaHCO_3$ solution. | 100 ml. saturated $NaHCO_3$ solution. | 100 ml. saturated $NaHCO_3$ solution. | 20 ml. saturated $NaHCO_3$ solution. |
|---|---|---|---|---|---|---|
| Emulsion treatment: | | | | | | |
| Emulsifier content, percent. | 0.25 | 0.25 | 0.25 | 0.38 | 0.5 | 0.25. |
| Volume used, ml | 100 | 100 | 100 | 100 | 100 | 78. |
| Application procedure | Poured through | Poured through | Poured through | Poured through | Poured through | Sprayed on slowly to appearance of cement in drainage. |
| Condition of emulsion draining from rock. | Unbroken | Broken[1] | Broken[1] | Broken[1] | Broken[1] | Broken.[1] |
| Binder deposited, parts/100 rock. | 0.27 | 1.35 | 1.56 | 1.36 | 1.10 | 1.66.[2] |

[1] Clear solution emerged rapidly, followed by slow emergence of cement.
[2] Appeared less evenly distributed than on the other specimens.

NOTE.—Test procedure=Specimen was ⅜" x No. 6 rock in 2¼ in. i.d., 5-in. high mold with open bottom protected by screen. Pretreatment was poured through. Binder treatment, added to rock while still wet, was a 75% emulsion of a 30% solids cement (containing antioxidant and antiozonant) emulsified with a salt of a quaternary ammonium base (15% elastomer, 7.5% resin, in emulsion). Specimen was dried after draining.

TABLE 9.—PRETREATMENT OF GRANITE BALLAST AGGREGATE WITH SODIUM BICARBONATE

| | Emulsion application | | | | Binder deposited (parts per 100 rock) | Appearance of specimen after drying [1] |
|---|---|---|---|---|---|---|
| | Percent | | Amount (parts per 100 rock) | Application procedure | | |
| Pretreatment | Solids content | Emulsifier content | | | | |
| None | 23.3 | 0.25 | 0.53 | Material sprayed in short increments until emulsion appeared on bottom surface; allowed to drain and dry overnight. | Approx. 0.25 | Cylinder was self-supporting but some loose rock was evident, several rocks apparently not wetted by binder. |
| Do | 23.3 | 0.25 | [2] 0.6 | Two applications as above each in 20% excess of binder retained in above experiment. Allowed to drain and dry overnight. | Not calculated | As above. |
| Ballast thoroughly wet by spraying with water. Saturated $NaHCO_3$ soln. (approx. 7 g./100 g. water) sprayed on at rate of 15.5 lb. soln./100 lb. rock and allowed to drain. | 23.3 | 0.25 | 1.25 | Single application as above; permitted to drain.[3] | Approx. 0.5 | Rocks well bound together with most binder at points of contact, very few loose rocks. |

[1] All tests run on 11¼" diameter, 12" high, specimens of 1½" x ¼" rock, using cylindrical mold lined with poly(ethylene) film, with wire screen placed across bottom.
[2] (0.3+0.3).
[3] It was observed that clear liquid appeared first in draining, followed by surplus of binder.

TABLE 10 (PART 1).—COMPARISON OF VARIOUS MATERIALS FOR PRETREATMENT OF GRANITE BALLAST AGGREGATE

| | Pretreatment | | | Binder treatment | | | Binder disposition | | Appearance of specimen after drying | |
|---|---|---|---|---|---|---|---|---|---|---|
| | | Concentration, g./100 percent and water | Total solution applied, g. | Amount applied | | Form of application | Runoff, percent of binder | Deposited, percent on rock | | |
| Water prewash | Chemical used | | | G. | Percent on rock | | | | Rating | Remarks |
| 1,000 cc | None | | | 102 | 1.1 | 225 g., 45% cement. | 4 | 1.08 | Poor | Rock well bound where contacted by cement; numerous rocks near bottom untouched by binder. |
| 1,000 cc | do | | | 102 | 1.1 | 300 g., 34% emulsion. | 83 | 0.19 | do | Specimen falls apart when mold is removed. Only a few rocks near top bound together which are easily pulled apart. |
| None | $NaNCO_3$ | 7 | 45 | 46 | 0.5 | 135 g., 34% emulsion. | 13 | 0.45 | do | About ¾ of rock bound together; best at top and down center of specimen. |

TABLE 10 (PART 1).—Continued

| Pretreatment | | | | Binder treatment | | | Binder disposition | | Appearance of specimen after drying | |
|---|---|---|---|---|---|---|---|---|---|---|
| Water prewash | Chemical used | Concentration, g./100 percent and water | Total solution applied, g. | Amount applied | | Form of application | Runoff, percent of binder | Deposited, percent on rock | Rating | Remarks |
| | | | | G. | Percent on rock | | | | | |
| None | NaHCO₃ | 7 | 45 | 46 | 0.5 | 202 g., 22.7% emulsion. | 33 | 0.35 | Very poor | Binder appears well distributed but quantity too low to impart strength. |
| 1,000 cc | NaHCO₃ | 7 | 135 | 102 | 1.1 | 300 g., 34% emulsion. | 64 | 0.41 | Fair | Binder well distributed at contact points but overall strength low. |
| None | NaOH | 4 | 45 | 46 | 0.5 | 135 g., 34% emulsion. | Nil | 0.51 | Poor | Penetration into specimen only 8 in.; well bound as far down as binder penetrated. |

TABLE 10 (PART 2)

| 1,000 cc | NaOH | 1 | 135 | 102 | 1.1 | 300 g., 34% emulsion. | 13 | 0.98 | Very good | Binder present at most contact points; very few loose rocks, overall strength excellent, adhesion to rock good. |
| 1,000 cc | NaOH | 2 | 135 | 92 | 1.0 | 270 g., 34% emulsion. | 14 | 0.88 | Good | Binder distribution good; very few loose rocks at bottom on edges. |
| 1,000 cc | NaOH | 2 | 135 | 92 | 1.0 | 540 g., 17% emulsion. | 24 | 0.77 | ...do | Binder distribution good; very few loose rocks at bottom on edges; not quite as good as above. |
| 1,000 cc | None | | | 92 | 1.0 | 540 g., 17% emulsion and 540 g. 0.5% NaOH applied simultaneously. | 5 | 0.98 | Poor | Binder, poorly distributed—most near top; bottom half of specimen fell apart on removal from mold. |

TABLE 10 (PART 3)

| 1,000 cc | Na₂CO₃ | 7 | 135 | 102 | 1.1 | 300 g., 34% emulsion. | 16 | 0.95 | Very good | Binder present at most contact points; very few loose rocks; overall strength excellent; adhesion to rock good. |
| 1,000 cc | Na₂CO₃ | 7 | 135 | 90 | 1.0 | 265 g., 34% emulsion. | 14 | 0.85 | Good | Appearance similar to above, but lower overall strength. |
| 1,000 cc | NH₃ | 0.5 | 135 | 92 | 1.0 | 270 g., 34% emulsion. | 25 | 0.77 | ...do | Binder distribution good, but heavier in lower portion. |
| 1,000 cc | NH₃ | 1 | 135 | 92 | 1.0 | ...do | 6 | 0.95 | Very good | Binder well distributed; rock well bound. |
| None | NH₃ | 1 | 270 | 92 | 1.0 | ...do | 30 | 0.70 | Fair | Rock not well bound at top of specimen. |

NOTE.—Specimen of 1½" x ¾" rock in 6" diameter, 12" high mold with wire screen bottom. Average specimen weight 8,950 g. Water prewash was by pouring through quickly. Pretreatment and emulsions applied by spraying rapidly. Rock allowed to drain 30 min. after pretreatment before applying binder. Runoff of emulsion collected until dripping ceased (about 1 hr.) then dried and weighed to calculate excess. Deposited binder calculated by difference. Specimens allowed to dry several days before removing mold and examining.

The results of the tests shown in Table 10 indicate that aqueous ammonia is the best material for the pretreatment, promising proper deposition of binder on the ballast in large-scale operations. Ammonia also has, in addition to the favorable normality equivalent ($NaHCO_3=84$; $Na_2CO_3=53$; $NaOH=40$; $NH_3=17$), the advantage that any surplus of treating agent remaining on the ballast disappears by evaporation.

The last two tests shown in Table 10 demonstrate the advantage of water-washing the ballast prior to the ammonia treatment.

As shown in Table 10, the optimum concentration of aqueous ammonia for use on granite ballast aggregate is about 1% $NH_3$. The concentration of electrolyte required for optimum deposition of binder has been found to vary with the surface characteristics of the rock aggregate. A higher concentration of electrolyte is required to obtain the same level of deposition on a quartzite aggregate as was required for granite aggregate, while alkaline aggregate requires no pretreatment.

The data in Table 11 shows the actual deposition obtained in four tests where the emulsion of Example 8 was applied in an amount equivalent to 1% binder on the rock aggregate.

TABLE 11

| Rock aggregate | Pretreatment | Binder applied (percent) | Binder deposited on aggregate (percent) |
|---|---|---|---|
| Granite | 1% NH₃ | 1.00 | 0.84 |
| Quartzite | 1% NH₃ | 1.00 | 0.45 |
| Do | 1.5% NH₃ | 1.00 | 0.73 |
| Do | 2% NH₃ | 1.00 | 0.88 |

An illustrative example of a suitable procedure for constructing a large test specimen is given in Example 14.

EXAMPLE 14

A specimen consisting of a truncated pyramid, 3 x 3 feet at the base, 2 x 2 feet at the top, and 1 foot high, was formed from 1½-inch by ¾-inch granite ballast rock by confining the sides with 1-inch chicken wire. This rock structure, having a total volume of 6.5 cubic feet (approximately 650 pounds), erected on a wooden pallet, was treated with the emulsion of Example 9 after pretreatment with aqueous ammonia.

Treatment was in three stages:

(1) Ballast was well washed with water from a hose and allowed to drain 30 minutes.

(2) Ballast was treated with 9.6 pounds ammonia solution of 1% $NH_3$ content applied from a 4-gallon sprayer through a fan-type nozzle (approximately 1.5 pounds per 100 pounds rock), and allowed to drain 15 minutes.

(3) Using the same spray equipment, ballast was sprayed while still wet with 19.1 pounds of the treating emulsion of 34% solids content (equivalent to 1 pound binder per 100 pounds rock). The application was carried out rapidly by moving the spray nozzle back and forth across the specimen until the total amount of the emulsion was evenly distributed.

The emulsion broke well and gradually while flowing through the rock. Run-off was minimal. One hour after treatment a substantial amount of strength had developed at the surface. After four days, when the specimen appeared dry, the chicken wire was removed. The rock structure was found to be well bound together, and prying loose a portion with a crowbar revealed that the binder was well distributed through the interior, constituting small elastic "pads" between all points of contact between rock particles, resulting in an open porous rock structure. The binder was dry throughout except for an area close to the bottom, where the wooden base had prevented proper drainage. The material deposited on the bottom of the rock pile, after drying, cemented the rock solidly to the supporting wooden base.

The procedure described above may be applied to rock ballast either as it is laid down and before mounting the rails thereon or after the ties and rails have been mounted on the ballast.

A water spray tank car or water spray truck is passed over the section of the road bed to be treated, and the ballast is washed with water and allowed to drain.

The ballast is then preferably treated with ammonia solution in the quantities described above in Example 14, employing equipment similar to or the same as that used in the water wash, and then allowed to drain.

Using the same or similar equipment, the emulsion is applied to the ballast, preferably in the manner and quantity employed in Example 14.

The result will be a unitary bonded open ballast in which the contiguous rock particles are bonded at contiguous localized surfaces by the elastomeric bonding agent in the manner described in connection with Example 14, to give an open ballast structure constituting a continuum.

We prefer not to employ closely graded rock aggregate of size distribution which will produce a dense bed of low porosity, for example, such as is used in rock pavement construction for vehicular traffic.

Instead, we prefer to employ as ballast crushed stone and crushed slag of character and size as specified in Federal Specification SS–C–743, entitled "Crushed Slag and Gravel for Railroad Ballast," issued Oct. 14, 1942. Such aggregate are in series of size ranges, e.g., 2½ inches to ¾ inch; 2 inches to 1 inch; 1 inch to ⅜ inch. The term "rock" in this specification is intended to include stone and slag; and crushed or uncrushed gravel is included within the definition of "aggregate" in said specification. Preferably we desire to employ such rock within the above ranges. It is intended to exclude graded aggregates which produce packed aggregates of low void content.

Although all binders used have utility as binders for aggregate, we prefer the emulsions of the type used in Examples 8, 9, 11, 12, and 13. Systems based on ambient-temperature-vulcanizing rubbers, polyurethane elastomers, and modified epoxy resins, although producing strong bonds, are of lesser practicality because of economic considerations and difficulties in methods of application.

Although only certain specific embodiments of the present invention have been described and illustrated herein, many changes and modifications will, of course, suggest themselves to those skilled in the art. These embodiments have been selected for this disclosure for the purpose of illustration only. The present invention should, therefore, not be limited to the embodiments so selected, the true scope of the invention being defined only in the appended claims.

We claim:

1. A process of forming a unitary bonded rock structure which comprises applying to an open body of rock aggregate an aqueous cationic emulsion of a mixture of from about 75% to about 25% by weight of an elastomeric poly(styrene)-poly(diene) block copolymer having poly(styrene) end blocks, and from about 75% to about 25% by weight of an amorphous stiffening resin which does not have elastic properties and is compatible with said copolymer based on the weight of said copolymer and said resin as 100%, and a cationic emulsifier.

2. The process of claim 1 in which the stiffening resin is a coumarone-indene resin having a softening point within the range of about 140° to about 300° F.

3. The process of claim 1 including the additional step of initially forming a bed of rock particles to which said aqueous cationic emulsion is applied in forming a unitary bonded rock structure.

4. The process of claim 1 wherein said block copolymer is a poly(styrene)-poly(butadiene) block copolymer having poly(styrene) end blocks.

5. The process of claim 1 wherein said emulsion is formed by dispersing said mixture in a solvent to form an emulsion base having a viscosity of about 20,000 to 30,000 centipoises at 25° C., as measured with a Brookfield viscometer, and a specific gravity of about 0.9 to 1.1, which emulsion base is then emulsified in water with said cationic emulsifier.

6. A process of forming a unitary rock structure which comprises applying to an open body of rock aggregate an alkaline solution, allowing said solution to wet the rock particles, and then applying to the rocks of said rock structure an aqueous cationic emulsion of a mixture of from about 75% to about 25% by weight of an elastomeric poly(styrene)-poly(diene) block copolymer having poly(styrene) end blocks and from about 75% to about 25% by weight of an amorphous stiffening resin which does not have elastic properties and is compatible with said copolymers based on the weight of said copolymer and said resin as 100%, and a cationic emulsifier.

7. The process of claim 6, in which the stiffening resin is a coumarone-indene resin having a softening point within the range of about 140° to about 300° F.

8. The process of claim 6, in which the alkaline solution is an ammonia solution.

9. The process of claim 6, including the additional step of initially forming a bed of rock particles to which said alkaline solution and said aqueous cationic emulsion are applied in forming a unitary rock structure.

10. The process of claim 6 wherein said block copolymer is a poly(styrene)-poly(butadiene) block copolymer having poly(styrene) end blocks.

11. The process of claim 6 wherein said emulsion is formed by dispersing said mixture in a solvent to form an emulsion base having a viscosity of about 20,000 to 30,000 centipoises at 25° C., as measured with a Brookfield viscometer, and a specific gravity of about 0.9 to 1.1, which emulsion base is then emulsified in water with said cationic emulsifier.

12. A process of forming a unitary bonded rock structure which comprises applying to an open body of rock aggregate an aqueous acidic cationic emulsion of a mixture of from about 75% to about 25% by weight of an elastomeric poly(styrene)-poly(diene) block copolymer having poly(styrene) end blocks, and from about 75% to about 25% by weight of an amorphous stiffening resin which does not have elastic properties and is compatible with said copolymers based on the weight of said copolymer and said resin as 100%, and a cationic emulsifier.

13. The process of claim 12 in which the stiffening resin is a coumarone-indene resin having a softening point within the range of about 140° to about 300° F.

14. The process of claim 12 including the additional step of initially forming a bed of rock particles to which said aqueous cationic emulsion is applied in forming a unitary bonded rock structure.

15. The process of claim 12 wherein said block copolymer is a poly(styrene)-poly(butadiene) block copolymer having poly(styrene) end blocks.

16. The process of claim 12 wherein said emulsion is formed by dispersing said mixture in a solvent to form an emulsion base having a viscosity of about 20,000 to 30,000 centipoises at 25° C., as measured by a Brookfield viscometer, and a specific gravity of about 0.9 to 1.1, which emulsion base is then emulsified in water with said cationic emulsifier.

17. A process of forming a unitary rock structure which comprises applying to an open body of rock aggregate an alkaline solution, allowing said solution to wet the rock particles, and then applying to the rocks of said rock structure an aqueous acidic cationic emulsion of a mixture of from about 75% to about 25% by weight of an elastomeric poly(styrene)-poly(diene) block copolymer having poly(styrene) end blocks and from about 75% to about 25% by weight of an amorphous stiffening resin which does not have elastic properties and is compatible with said copolymer based on the weight of said copolymer and said resin as 100%, and a cationic emulsifier.

18. The process of claim 17, in which the stiffening resin is a courmarone-indene resin having a softening point within the range of about 140° to about 300° F.

19. The process of claim 17, in which the alkaline solution is an ammonia solution.

20. The process of claim 17, including the additional step of initially forming a bed of rock particles to which said alkaline solution and said aqueous cationic emulsion are applied in forming an unitary rock structure.

21. The process of claim 17 wherein said block copolymer is a poly(styrene)-poly(butadiene) block copolymer having poly(styrene) end blocks.

22. The process of claim 17 wherein said emulsion is formed by dissolving said mixture in a solvent to form an emulsion base having a viscosity of about 20,000 to 30,000 centipoises at 25° C., as measured with a Brookfield viscometer, and a specific gravity of about 0.9 to 1.1, which emulsion base is then emulsified in water with said cationic emulsifier.

References Cited
UNITED STATES PATENTS

| | | | |
|---|---|---|---|
| 2,643,235 | 6/1953 | Brams | 260—829 |
| 2,681,322 | 6/1954 | Auer | 260—29.7 NR |
| 3,070,570 | 12/1962 | Gessler et al. | 260—829 |
| 3,325,430 | 6/1967 | Grasley | 260—876 B |
| 3,351,606 | 11/1967 | Wheat | 260—33.6 R |
| 3,437,613 | 4/1969 | Gaestel et al. | 260—29.7 NR |
| 3,439,450 | 4/1969 | Richards | 161—168 |
| 3,686,107 | 8/1972 | Russell | 260—876 B |

GEORGE F. LESMES, Primary Examiner

J. J. BELL, Assistant Examiner

U.S. Cl. X.R.

161—168; 260—29.7 UA, 876 B, 33.6 A, 29.6 NR